United States Patent [19]
Baba et al.

[11] Patent Number: 6,059,993
[45] Date of Patent: May 9, 2000

[54] RECORD DISPLAY MEDIUM AND USE THEREOF

[75] Inventors: Atsushi Baba; Hidetoshi Ozawa; Yoshinori Kinase, all of Tokyo-To, Japan

[73] Assignee: Dai Nippon Printing Co., Ltd., Japan

[21] Appl. No.: 08/992,633

[22] Filed: Dec. 18, 1997

[30] Foreign Application Priority Data

Dec. 24, 1996 [JP] Japan .................................... 8-355469

[51] Int. Cl.⁷ .................... C09K 19/00; C09K 19/12; C09K 19/32
[52] U.S. Cl. ................ 252/299.1; 252/299.01; 252/299.66; 252/299.62
[58] Field of Search ................ 252/299.01, 299.62, 252/299.1, 299.66

[56] References Cited

U.S. PATENT DOCUMENTS

| | | | |
|---|---|---|---|
| 4,994,204 | 2/1991 | Doane et al. | 252/299.01 |
| 5,024,784 | 6/1991 | Eich et al. | 252/299.01 |
| 5,026,577 | 6/1991 | Biresaw et al. | 428/1 |
| 5,118,586 | 6/1992 | Hattori et al. | 430/20 |
| 5,240,636 | 8/1993 | Doane et al. | 252/299.01 |
| 5,354,498 | 10/1994 | Akasji et al. | 252/299.01 |
| 5,426,009 | 6/1995 | Coates et al. | 430/20 |
| 5,523,127 | 6/1996 | Ohnishi et al. | 428/1 |
| 5,543,267 | 8/1996 | Stumpe et al. | 430/290 |
| 5,558,813 | 9/1996 | Akashi et al. | 252/299.01 |
| 5,583,670 | 12/1996 | Iijima et al. | 349/86 |
| 5,589,237 | 12/1996 | Akashi et al. | 428/1 |
| 5,620,781 | 4/1997 | Akashi et al. | 428/195 |
| 5,641,426 | 6/1997 | Nerad et al. | 252/299.01 |
| 5,645,758 | 7/1997 | Kawasumi et al. | 252/299.01 |
| 5,670,083 | 9/1997 | Akashi et al. | 252/299.01 |
| 5,686,017 | 11/1997 | Kobayashi et al. | 252/299.01 |
| 5,707,543 | 1/1998 | Akashi et al. | 252/299.01 |

FOREIGN PATENT DOCUMENTS

| | | |
|---|---|---|
| 0 520 754 A2 | 12/1992 | European Pat. Off. . |
| 0 643 318 A1 | 3/1995 | European Pat. Off. . |
| 0 743 350 A1 | 11/1996 | European Pat. Off. . |
| 0 790 289 A1 | 8/1997 | European Pat. Off. . |
| WO 96/20986 | 7/1996 | WIPO . |

*Primary Examiner*—C. H. Kelly
*Attorney, Agent, or Firm*—Parkhurst & Wendel, L.L.P.

[57] ABSTRACT

A record display medium that can display a high contrast image and is less likely to cause a lowering of contrast or disappearance of the displayed image even in low temperature and high temperature regions. The record display medium has a conductive substrate and a liquid crystal/polymer composite film provided on the conductive substrate. The liquid crystal/polymer composite film includes a smectic liquid and a dichroic dye dispersed in a polymer matrix. The liquid crystal contains a liquid crystal mixture having a specific composition and the dichroic dye is a black dichroic dye formed of a mixture of dichroic azo dyes.

10 Claims, No Drawings

RECORD DISPLAY MEDIUM AND USE THEREOF

BACKGROUND OF THE INVENTION

The present invention relates to a record display medium using a smectic liquid crystal/polymer composite film, which is responsive to an electric field or heat to display or record various types of information, and use thereof. The record display medium of the present invention can be widely used as rewritable cards, displays, and other record display media.

At the present time, liquid crystals are applied as a display material to a variety of equipment and have been put to practical use in watches, clocks, pocket calculators, miniature televisions and the like. A nematic liquid crystal has been used for this purpose, and TN type and STN type display systems have been adopted.

This type of display device comprises a liquid crystal cell having a transparent electrode, a liquid crystal sealed thereinto, and a polarizing plate provided on both sides of the cell. The use of the polarizing plate results in a lowered angle of visibility and lack of brightness, necessitating a backlight having high power consumption. In addition, increasing the display area is difficult due to the necessity of making the cell thickness even, and there are additional problems such as a complicated structure and a high production cost.

In recent years, liquid crystal dispersion type devices using a liquid crystal/polymer composite film, wherein a liquid crystal is dispersed in a polymer matrix, have attracted attention as a liquid crystal display medium which can solve the above problems. Among them, those utilizing a smectic liquid crystal enable the liquid crystal to be maintained aligned even after removal of external energy used for alignment of the liquid crystal and hence have a memory effect, rendering these display devices useful as rewritable recording display media.

Not only a high contrast image but also such a high performance that causes neither lowering of the contrast nor disappearance of the displayed image in low temperature and high temperature regions is required of the rewritable recording display medium utilizing the smectic liquid crystal. At the present time, there is no record display medium which can satisfactorily meet this requirement.

Accordingly, an object of the present invention is to provide a record display medium that can display a high contrast image and is less likely to cause a lowering of contrast or disappearance of the displayed image even in low temperature and high temperature regions.

DISCLOSURE OF INVENTION

The above object of the present invention can be attained by a record display medium comprising: a conductive substrate; and a liquid crystal/polymer composite film provided on the conductive substrate, the liquid crystal/polymer composite film comprising a smectic liquid crystal and a dichroic dye dispersed in a polymer matrix, the liquid crystal comprising a liquid crystal mixture having the following composition, the dichroic dye comprising a black dichroic dye comprised of a mixture of dichroic azo dyes:

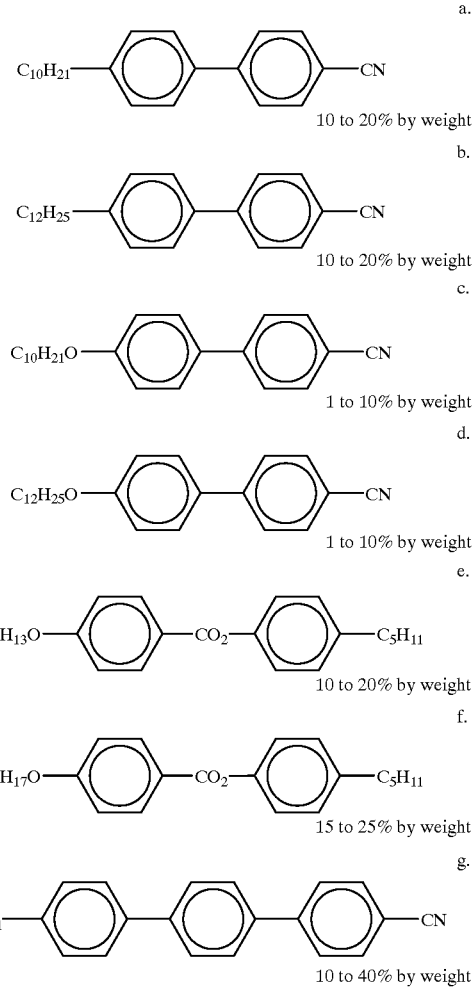

Use of a specific liquid crystal composition in combination with a specific dichroic dye as a liquid crystal can provide a liquid crystal/polymer composite film type record display medium which can display a high contrast image and is less likely to cause a lowering of contrast or disappearance of the displayed image even in low temperature and high temperature regions.

BEST MODE FOR CARRYING OUT THE INVENTION

The present invention will be described in more detail with reference to the following preferred embodiments.

The liquid crystal composition used in the formation of the record display medium of the present invention comprises a mixture of six liquid crystal compounds represented by the structural formulae a to g in the above specific proportion ranges. When the amounts of the liquid crystal compounds are outside the above respective ranges, problems are unfavorably posed such as lowered contrast and a change in hue.

4-Alkyl-4'-cyanobiphenyls or 4-alkoxy-4'-cyanobiphenyls, having 10 and 12 carbon atoms, represented by the structural formulae a to d exhibit a stable smectic liquid crystal phase around room temperature and, in the form of a liquid crystal/polymer composite film type record display medium, provide a good contrast.

These compounds are known in the art (for example, Kusabayashi, "EKISHOU ZAIRYO," p. 229 (1991), published by Kodansha Ltd.), and, for example, 4-alkyl-4'-bromovinylphenyl or 4-alkoxy-4'-bromobiphenyl can be reacted with copper cyanide to give a corresponding 4-alkyl-4'-cyanobiphenyl or 4-alkoxy-4'-cyanobiphenyl. Some of these compounds are commercially available.

However, use of compounds having a high phase transition temperature, between the smectic liquid crystal phase and the nematic liquid crystal phase or between the smectic liquid crystal phase and the isotropic phase, as the compounds represented by the structural formulae a to d, gives rise to an increase in melting point and, when the record display medium is allowed to stand at a low temperature, causes the orientation of the liquid crystal to be disturbed, resulting in a lowering of contrast or disappearance of display in the record display area.

For this reason, the present inventors have made studies with a view to increasing the phase transition temperature between the smectic liquid crystal phase and the nematic liquid crystal phase or between the smectic liquid crystal phase and the isotropic phase while keeping the melting temperature low and, as a result, have found that addition of the compound represented by the structural formulae e to g to the compounds represented by the structural formulae a to d can realize this.

The 4-alkylphenyl 4-alkoxybenzoate compounds represented by the structural formulae e and f are known in the art (for example, Kusabayashi, "EKISHOU ZAIRYO," p. 226 and p. 240 (1991), published by Kodansha Ltd.) and can be prepared, for example, by esterifying a 4-alkylphenol with a 4-alkoxy benzoate using a dicyclohexylcarbodiimide or the like as a dehydrating agent, and some of these compounds are commercially available.

The 4-alkyl-4"-cyano-p-terphenyl compound represented by the structural formula g is known in the art [for example, Mol. Cryst. Liq. Cryst., 38, pp. 345–352 (1977)] and can be prepared, for example, by treating a 4-alkyl-p-terphenyl-4"-carboxylic acid chloride with aqueous ammonia to give a 4-alkyl-p-terphenyl-4"-carboxylic acid amide which is then reacted with phosphorus pentoxide. Some of these compounds are commercially available.

The compounds represented by the general formulae e to g serve to increase the smectic-nematic phase transition temperature or the smectic-isotropic phase transition temperature. The storage stability of records at high temperatures becomes better with increasing the phase transition temperature, and the phase transition temperature is preferably 60° C. or above, particularly preferably 60° to 130° C.

According to the present invention, a black dichroic dye comprising a mixture of azo dichroic dyes is added to the above liquid crystal composition to improve the contrast ratio of a display image. The amount of the dichroic dye added is, for example, preferably 1 to 10 parts by weight, more preferably 1 to 3 parts by weight, based on 100 parts by weight of the liquid crystal composition.

Examples of dichroic dyes useful in the present invention are as follows.

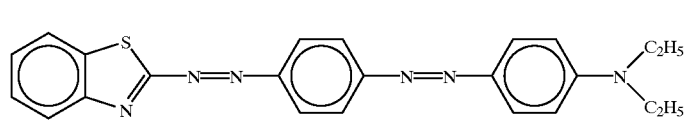

(1)

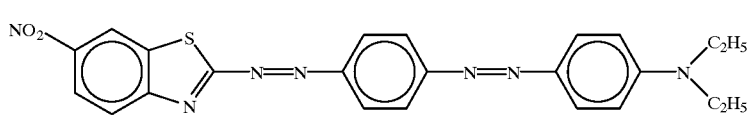

(2)

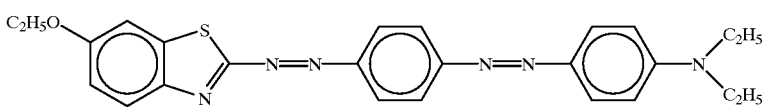

(3)

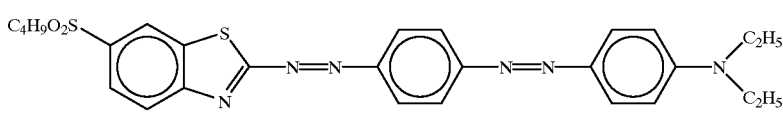

(4)

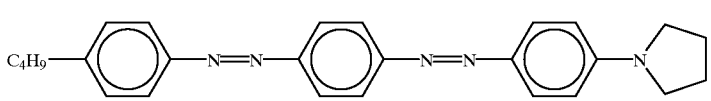

(5)

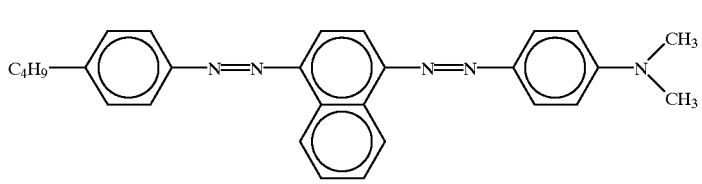

(6)

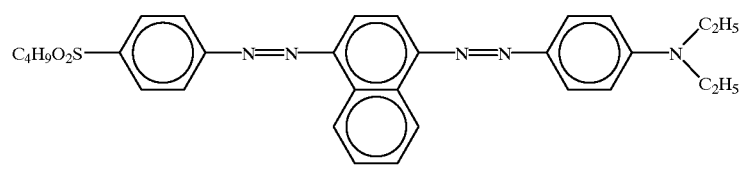
(7)
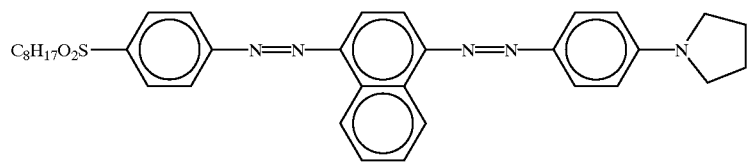
(8)
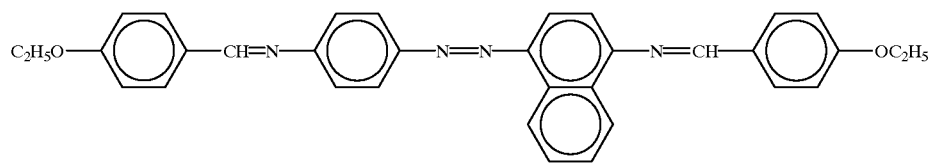
(9)
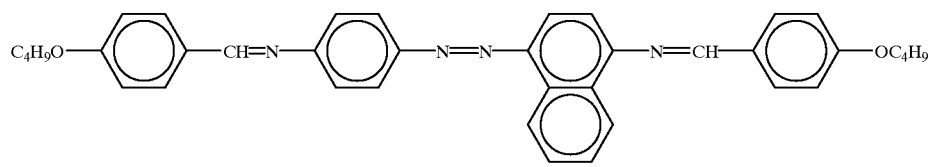
(10)
(11)
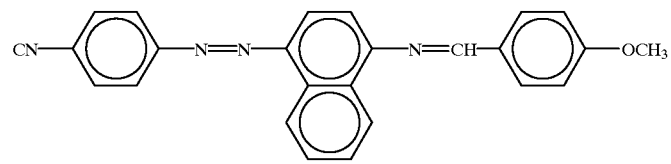
(12)
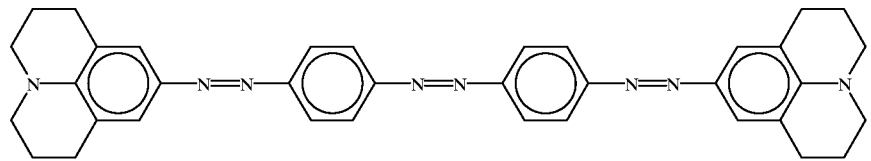
(13)
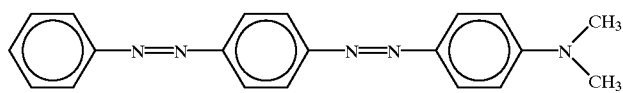
(14)
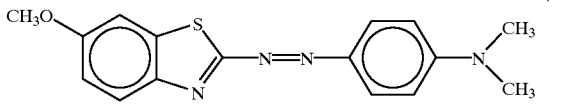
(15)
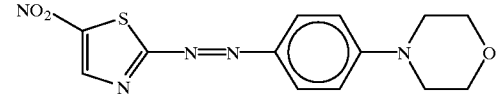
(16)

-continued

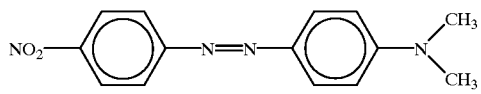
(17)

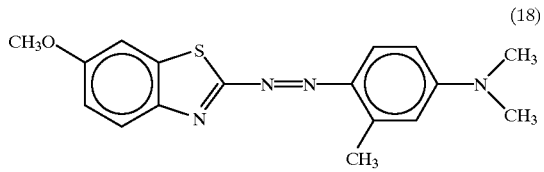
(18)

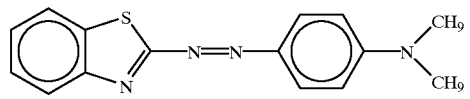
(19)

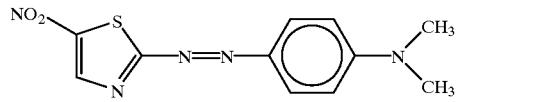
(20)

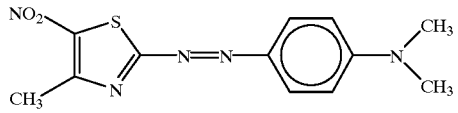
(21)

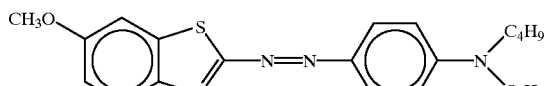
(22)

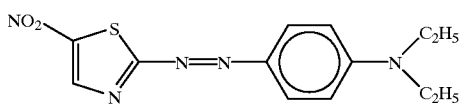
(23)

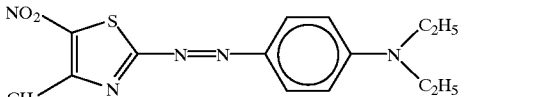
(24)

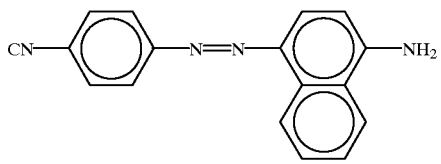
(25)

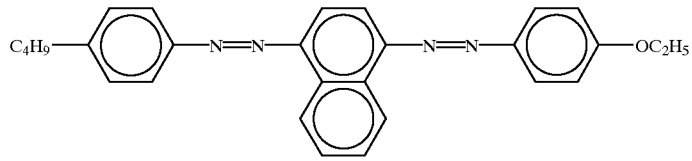
(26)

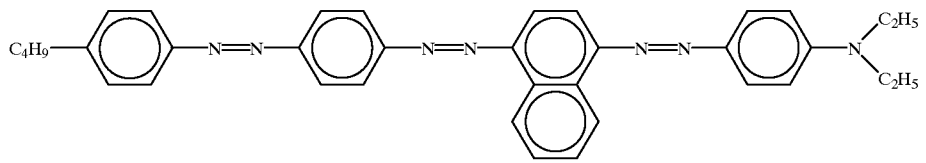
(27)

All the above azo dichroic dyes are known in the art. In the present invention, two or more dichroic dyes are selected from the above azo dichroic dyes and mixed together to prepare a black mixture. Preferred is a mixture having a composition which, when used as the record display medium of the present invention, provides a difference in lightness between a written area and an erased area in the record display medium, $|\Delta L^*|$, in the range of from 5 to 25 or a mixture having a composition which, when used as the record display medium of the present invention, provides a difference in chroma between a written area and an erased area in the record display medium, $|\Delta C^*|$, in the range of from 0 to 10.

Preferably, the dichroic dye is selected from the above dyes (26) and (27). More preferably, the dichroic dye comprises a mixture comprising at least 20 to 40% by weight of the dye (26) and 20 to 40% by weight of the dye (27).

Formation of a liquid crystal/polymer composite film, comprising the liquid crystal composition and the dichroic dye dispersed in a polymer matrix, on a conductive substrate provides the writable record display medium of the present invention. Preferred embodiments of the writable record display medium will be described. The present invention, however, is not limited to these preferred embodiments.

Any polymeric material having low compatibility with the liquid crystal composition and excellent transparency and film-forming properties may be used as a polymeric material for constituting the polymer matrix which serves to fix the liquid crystal composition and the dichroic dye. More specifically, for example, water-soluble polymeric materials having excellent transparency and film-forming properties, such as polyvinyl alcohol, gelatin, acrylic acid copolymer, and water-soluble alkyd resins, and hydrophobic polymeric materials, such as polymers of fumaric acid derivatives, copolymers thereof, acrylic resin, polyester resin, and polyamide resin, may be used, and any suitable polymeric material may be selected and used according to methods of forming the composite film.

The liquid crystal composition and the polymer matrix are used in a polymer matrix to liquid crystal mixing ratio (weight ratio) of 5:95 to 50:50. When the amount of the liquid crystal used is excessively small, the transparency is unsatisfactory during the application of an electric field and, at the same time, a very high electric field is necessary for bringing the film to a transparent state. On the other hand, the use of an excessively large amount of the liquid crystal results in unsatisfactory scattering (turbidity) when the electric field is off. Further, in this case, the strength of the film is deteriorated.

The liquid crystal composition may be dispersed in the polymer matrix by any conventional method such as a phase separation or emulsion method.

The emulsion method comprises emulsifying and dispersing a liquid crystal composition in a medium composed mainly of water and optionally containing a surfactant and a protective colloid, adding a water-soluble or water-dispersible polymeric material, such as polyvinyl alcohol, gelatin, an acrylic acid copolymer, or a water-soluble alkyd resin, in the resultant emulsion, coating the mixture onto a suitable substrate, and drying the coating to form a film having a suitable thickness. According to this method, a liquid crystal/polymer composite film is formed wherein a liquid crystal is homogeneously dispersed in the resultant film.

Useful methods for emulsification and dispersion of the liquid crystal in the aqueous solution or water dispersion of the polymer matrix include mixing by means of various agitators such as an ultrasonic dispergator, and dispersing such as film emulsification [see Tadao Nakajima/Masataka Shimizu, PHARMTECH JAPAN, Vol. 4, No. 10 (1988)]. For example, when an O/W emulsion for a liquid crystal is prepared using a porous glass (MPG) film emulsification system, the average particle diameter of the liquid crystal to be emulsified and dispersed can be varied, as desired, by varying the average pore diameter of MPG used.

The formation of a liquid crystal/polymer composite film, on an electrode substrate, using the above liquid crystal emulsion can be carried out, for example, by electrodeposition coating, screen printing, stencil printing using a metallic mask, brush coating, spray coating, blade coating, or doctor coating.

The liquid crystal/polymer composite film in the present invention may be, of course, prepared also by a method which comprises mixing a liquid crystal composition and a hydrophobic polymeric material incompatible with the liquid crystal composition, for example, a polymer or copolymer of a fumaric acid derivative, an acrylic resin, a polyester resin, or a polyamide resin, together in a suitable ratio to prepare an organic solvent solution, coating the solution on a substrate by suitable coating means, removing the solvent by evaporation to form a film, and performing phase separation of the liquid crystal from the polymer matrix simultaneously with the formation of the film.

The electrode substrate (conductive substrate) used in the present invention may be any conductive substrate commonly used in conventional record display media, and specific examples thereof include a pair of electrode substrates wherein a transparent conductive material, such as an ITO, $SnO_2$-based, or ZnO-based material, is deposited onto a transparent substrate such as glass or a polymer film. In this case, when an opaque conductive substrate is used as the other substrate, for example, a substrate with a reflective electrode of aluminum provided thereon is preferred because the electrode substrate is required to serve also as a reflector.

The substrate per se may be made of glass, a polymer film or other material.

As described above, after a liquid crystal/polymer composite film is formed on an electrode substrate, it is dried at room temperature or such a temperature as will have no influence on the liquid crystal, thereby preparing the liquid crystal/polymer composite film of the present invention. In this case, the thickness of the liquid crystal/polymer composite film is generally about 3 to 23 $\mu$m. When it is less than 3 $\mu$m, the contrast of the display is lowered, while when it exceeds 23 $\mu$m, the driving electric field is unfavorably high.

According to one preferred embodiment of the present invention, there is provided a record display medium comprising a liquid crystal/polymer composite film provided between a pair of conductive substrates with at least one of the substrates being transparent, the liquid crystal/polymer composite film comprising a liquid crystal composition dispersed in a polymer matrix. Regarding the drive of the record display medium, information stored in the record display medium is erased by the application of an electric field, while information is written into the record display medium by the application of heat.

According to another preferred embodiment of the present invention, there is provided an information display medium comprising the above liquid/polymer composite film provided on a conductive substrate and a protective layer, provided on the liquid crystal/polymer composite film, optionally through an intermediate layer. In this type of rewritable record display medium, the application of a voltage through the protective layer gives rise to orientation of the liquid crystal to permit light to pass therethrough, thereby erasing information, and heating causes the orientation of the liquid crystal to be disturbed, thereby writing the information.

In the above rewritable record display medium, the intermediate layer may be formed of the same resin as used in the polymer matrix, and the protective layer may be formed of a thermosetting resin, an ultraviolet-curing resin, or an electron beam-curing resin, for example, a polyene-thiol, a polymerizable acrylate polymer, having in its molecule a (meth)acryloyl group, such as urethane acrylate, epoxy acrylate, or silicone acrylate, or a known curing resin comprising a monofunctional or polyfunctional monomer such as methyl methacrylate.

This embodiment will be described by taking an information rewritable card as an example.

In the case of an information rewritable card, only one electrode is used. The substrate for the electrode should be particularly preferably a polymer film. A white polyethylene terephthalate (PET) film is desired as the film. A metal, such as aluminum, besides a transparent conductive material, such as ITO, may be used for the conductive layer. Further, a protective layer is provided on the composite film in order to protect the liquid/polymer composite film. Although the material for the protective film is not particularly limited, a curing resin having mechanical strength, water resistance or other properties is preferred.

For example, UV- or electron beam-curing poly(meth) acrylate or polyurethane (meth)acrylate is used. When the above protective layer cannot be formed directly on the liquid crystal/polymer composite film, a thin film of a water-soluble polymer, such as polyvinyl alcohol, may be formed as an intermediate layer between the composite film and the protective film. Alternatively, the above protective film material formed on a separate sheet may be transferred or laminated and then cured to form a protective layer. In the case of cards, the suitable range of the ratio of the liquid crystal to the polymer is different from that in the case of the display, and the weight ratio of the liquid crystal to the polymer is preferably 55:45 to 35:65.

Recording of information on a card having the above construction and erasing of information from the card will be described.

Information is erased by heating a liquid crystal/polymer composite film layer and applying a necessary electric field to permit liquid crystal molecules to align in the electric field direction. Corona charging is particularly useful for the application of the electric field. Recording of the information is performed by applying necessary heat to the composite film layer to disturb the alignment of liquid crystal molecules in the heated area. Use of a thermal head is preferred for the application of heat.

The liquid crystal composition containing a dichroic dye (hereinafter referred to simply as "liquid crystal") used in the present invention may be enmicrocapsulated. The enmicrocapsulation may be carried out by the following preferred method.

Specifically, a capsule wall film for surrounding the liquid crystal can be prepared by emulsifying or dispersing the liquid crystal in a water medium with the aid of a free radical reactive surfactant, a water-soluble protective colloid, or a radical reactive protective colloid or a mixture of two or more of them, dissolving or dispersing a free-radical initiator in water or the liquid crystal, and heating the system to the decomposition temperature of the initiator.

Alternatively, a capsule wall film for surrounding the liquid crystal may be prepared by emulsifying and dispersing a liquid crystal dissolved in a free-radical reactive monomer in a water medium with the aid of a water-soluble protective colloid, dissolving or dispersing a free-radical initiator in water or the liquid crystal, and heating the system to the decomposition temperature of the initiator.

The free-radical reactive surfactant may be a commercially available ionic or nonionic reactive surfactant, and examples thereof include sodium styrenesulfonate, polyethylene glycol diacrylate, and polypropylene glycol polytetramethylene glycol. A mixture of bi- or higher functional surfactants is preferred. Examples of the water-soluble protective colloid include partially saponified polyvinyl alcohol, hydroxyethyl cellulose, and polyethylene glycol.

The free-radical reactive protective colloid may be any one having an addition-polymerizable double bond, such as a polymer having a hydrophilic group and a hydrophobic group with a free-radical reactive group introduced into the side chain thereof, for example, a (partially saponified) polyvinyl alcohol with an acryloyl group introduced into the hydroxyl group thereof.

The free-radical polymerizable monomer to be dissolved in the liquid crystal may be a monomer, compatible with the liquid crystal, such as styrene, vinyl acetate, or (meth)acrylic ester. Preferably, a bi- or higher functional monomer is mixed with the free-radical polymerizable monomer.

The polymerization initiator may be any of water-soluble and oil-soluble polymerization initiators. When raising the polymerization temperature is unfavorable, a redox polymerization initiator may be used. Further, it is also possible to initiate the polymerization by means of ionizing radiation such as γ rays or electron beams.

In the enmicrocapsulated liquid crystal having the above construction, the amount of the polymeric material used as the wall material is preferably in the range of from 5 to 25 parts by weight based on 100 parts by weight of the smectic liquid crystal as the core substance. When the amount of the wall material used is less than the above range, the thickness of the wall is so small that a problem of oozing of the liquid crystal cannot be fully solved.

On the other hand, when it exceeds the above range, the thickness of the wall is so large that the amount of the dichroic dye incorporated into the wall is increased. This causes the wall to be colored, posing problems including that the reflection density does not become satisfactorily low at the time of application of a voltage. The thickness of the wall in the encapsulated state may vary depending upon the liquid crystalline material, polymeric material, and encapsulation method used and the like. It, however, is generally about 10 to 100 nm.

The present invention will be described in more detail with reference to the following examples and comparative examples. In the following examples and comparative examples, "parts" are by weight.

Preparation of Liquid Crystal Compositions

The liquid crystal compounds a to g were provided and mixed according to the formulation given in Table 1 to prepare a liquid crystal composition.

TABLE 1

| Liquid crystal compound | Composition (wt %) |
|---|---|
| a | 14.2 |
| b | 14.2 |
| c | 3.5 |
| d | 3.1 |
| e | 14.0 |
| f | 21.0 |
| g | 30.0 |

Measurement of Properties

The above composition was poured into a cell, which has a thickness of 12 $\mu$m, is provided with an aligning film of the polyimide, and has been subjected to parallel rubbing treatment, and the phase transition was observed under a polarizing microscope to measure the phase transition temperature at the time of temperature falling (−2° C./min). As a result, the phase transition temperature was I(113)N(100) $S_A$(10)C wherein I represents an isotropic liquid, $S_A$ a smectic A phase, $S_X$ a smectic X phase, N a nematic phase, and C a crystal.

EXAMPLE 1

0.04 part by weight of a black dichroic dye (G241+G206+ G472 (weight ratio 4/4/3), manufactured by Nihon Kanko Shikiso Kenkyusho (Japan Photosensitive Dye Laboratory)) was added to 2 parts by weight of the liquid crystal composition prepared above, and 8.16 parts by weight of a 10 wt % aqueous solution of PVA (FG-05, manufactured by Nippon Synthetic Chemical Industry Co., Ltd.; degree of polymerization 500; degree of saponification 86.5 to 89.0) was added thereto, followed by mechanical dispersion. 12.24 g of a 10 wt % aqueous solution of PVA (KH-20, manufactured by Nippon Synthetic Chemical Industry Co., Ltd.; degree of polymerization 2000; degree of saponification 78.5 to 81.5) was added as a thickening agent to the dispersion, and the mixture was stirred.

The dispersion was coated on an ITO-deposited white PET substrate by means of a doctor blade, and the coating was dried to form an 8 μm-thick liquid crystal/polymer composite film.

A 10 wt % aqueous solution of PVA (KH-20, manufactured by Nippon Synthetic Chemical Industry Co., Ltd.; degree of polymerization 2000; degree of saponification 78.5 to 81.5) was coated on the liquid crystal/polymer composite film by means of a doctor blade, and the resultant coating was dried to form an intermediate layer. Subsequently, an ultraviolet curable resin (urethane acrylate) was coated on the whole surface of each intermediate layer by means of a doctor blade, and the resultant coating was cured by irradiation with ultraviolet light from a high pressure mercury lamp (output: 120 W/cm$^2$) to form a 2 μm-thick protective layer.

For record display medium using the liquid crystal/polymer composite film thus prepared, corona discharge (corona voltage: 6.5 kV) gave rise to an erased state, while thermal recording by means of a thermal head or the like gave rise to a written state.

The lightness and the chroma for the written area and the erased area in the written state of the record display medium were measured with a spectrophotometric calorimeter (CM-1000R, manufactured by Minolta). As a result, the difference in lightness between the written area and the erased area was 11.1, and the difference in chroma between the written area and the erased area was 2.2, indicating that the displayed image had a high contrast.

EXAMPLE 2

0.04 part by weight of a dichroic dye (manufactured by Nihon Kanko Shikiso Kenkyusho (Japan Photosensitive Dye Laboratory)) was added to 2 parts by weight of the liquid crystal composition specified in Table 1. The liquid crystal composition containing the dichroic dye was added to 30 parts of a solution of 2.7 parts by weight of polymethyl methacrylate (PMMA M1002B, manufactured by Soken Chemical Co., Ltd., average molecular weight 300,000 to 550,000) and 0.3 part by weight of a plasticizer in 27 parts by weight of a solvent (toluene/methyl ethyl ketone/ethyl acetate), and the mixture was stirred for 10 hr at room temperature to prepare a solution. This solution was coated by means of a doctor blade onto an ITO-deposited white PET substrate, and the coating was dried to prepare an 8 μm-thick liquid crystal/polymer composite film.

Further, an ultraviolet light curable resin (urethane acrylate) was coated by means of a doctor blade onto the whole surface of the liquid crystal/polymer composite film. The coating was irradiated with ultraviolet light emitted from a high pressure mercury lamp (output 120 W/cm$^2$) to cure the coating, thereby forming a 2 μm-thick protective layer. Thus, a record display medium according to the present invention was prepared.

For record display medium using the liquid crystal/polymer composite film thus prepared, corona discharge (corona voltage: 6.5 kV) gave rise to an erased state, while thermal recording by means of a thermal head or the like gave rise to a written state.

The lightness and the chroma for the written area and the erased area in the written state of the record display medium were measured with a spectrophotometric calorimeter (CM-1000R, manufactured by Minolta). As a result, the difference in lightness between the written area and the erased area was 11.1, and the difference in chroma between the written area and the erased area was 2.2, indicating that the displayed image had a high contrast.

COMPARATIVE EXAMPLE 1

A comparative display medium was produced in the same manner as in Example 1, except that a black dichroic dye (S-428, manufactured by Mitsui Toatsu Chemicals, Inc.) was used instead of the dichroic dye in Example 1. The dye (S-428) comprises a mixture of a red dye (an azo dye), a yellow dye (an azo dye), and a blue dye (an anthraquinone dye) in respective amounts of 16% by weight, 7% by weight, and 67% by weight.

For record display medium using the liquid crystal/polymer composite film thus prepared, corona discharge (corona voltage: 6.5 kV) gave rise to an erased state, while thermal recording by means of a thermal head or the like gave rise to a written state.

The lightness and the chroma for the written area and the erased area in the written state of the record display medium were measured with a spectrophotometric colorimeter (CM-1000R, manufactured by Minolta). As a result, the difference in lightness between the written area and the erased area was 3.2, and the difference in chroma between the written area and the erased area was 1.1, indicating that the displayed image had an unsatisfactory contrast.

Thus, the record display media according to the present invention could offer a markedly improved contrast.

EXAMPLE 3

0.04 part by weight of a black dichroic dye (G206:G241:SI800=4:3.5:3.5; G206 and G241: dyes manufactured by Nihon Kanko Shikiso Kenkyusho (Japan Photosensitive Dye Laboratory), SI800: an azo dye manufactured by Mitsui Toatsu Chemicals, Inc.) was added to 2 parts of the liquid crystal composition specified in Table 1. The composition containing the dichroic dye was added to 30 parts of a solution of 2.7 parts by weight of polymethyl methacrylate (PMMA M1002B, manufactured by Soken Chemical Co., Ltd., average molecular weight 300,000 to 550,000) and 0.3 part by weight of a plasticizer in 27 parts by weight of a solvent (toluene/methyl ethyl ketone/ethyl acetate), and the mixture was stirred for 10 hr at room temperature to prepare a solution. This solution was coated by means of a doctor blade onto an ITO-deposited white PET substrate, and the coating was dried to prepare an 8 μm-thick liquid crystal/polymer composite film.

Further, an ultraviolet light curable resin (urethane acrylate) was coated by means of a doctor blade onto the whole surface of the liquid crystal/polymer composite film. The coating was irradiated with ultraviolet light emitted from a high pressure mercury lamp (output 120 W/cm$^2$) to cure the coating, thereby forming a 2 μm-thick protective layer. Thus, a record display medium according to the present invention was prepared.

For record display medium using the liquid crystal/polymer composite film thus prepared, corona discharge (corona voltage: 6.5 kV) gave rise to an erased state, while thermal recording by means of a thermal head or the like gave rise to a written state.

The lightness and the chroma for the written area and the erased area in the written state of the record display medium were measured with a spectrophotometric colorimeter (CM-1000R, manufactured by Minolta). As a result, the difference in lightness between the written area and the erased area was 8.8, and the difference in chroma between the written area and the erased area was 2.3, indicating that the displayed image had a high contrast.

EXAMPLE 4

0.04 part by weight of a black dichroic dye (G206:G241:SI800=4:5:1; G206 and G241: dyes manufactured by Nihon Kanko Shikiso Kenkyusho (Japan Photosensitive Dye Laboratory), SI800: an azo dye manufactured by Mitsui Toatsu Chemicals, Inc.) was added to 2 parts of the liquid crystal composition specified in Table 1. The composition containing the dichroic dye was added to 30 parts of a solution of 2.7 parts by weight of polymethyl methacrylate (PMMA M1002B, manufactured by Soken Chemical Co., Ltd., average molecular weight 300,000 to 550,000) and 0.3 part by weight of a plasticizer in 27 parts by weight of a solvent (toluene/methyl ethyl ketone/ethyl acetate), and the mixture was stirred for 10 hr at room temperature to prepare a solution. This solution was coated by means of a doctor blade onto an ITO-deposited white PET substrate, and the coating was dried to prepare an 8 μm-thick liquid crystal/polymer composite film.

Further, an ultraviolet light curable resin (urethane acrylate) was coated by means of a doctor blade onto the whole surface of the liquid crystal/polymer composite film. The coating was irradiated with ultraviolet light emitted from a high pressure mercury lamp (output 120 W/cm$^2$) to cure the coating, thereby forming a 2 μm-thick protective layer. Thus, a record display medium according to the present invention was prepared.

For record display medium using the liquid crystal/polymer composite film thus prepared, corona discharge (corona voltage: 6.5 kV) gave rise to an erased state, while thermal recording by means of a thermal head or the like gave rise to a written state.

The lightness and the chroma for the written area and the erased area in the written state of the record display medium were measured with a spectrophotometric calorimeter (CM-1000R, manufactured by Minolta). As a result, the difference in lightness between the written area and the erased area was 9.0, and the difference in chroma between the written area and the erased area was 2.0, indicating that the displayed image had a high contrast.

As is apparent from the foregoing description, use of a specific liquid crystal composition in combination with a specific dichroic dye as a liquid crystal can provide a liquid crystal/polymer film type record display medium that can display a high contrast image and is less likely to cause a lowering of contrast or disappearance of the displayed image even in low temperature and high temperature regions.

We claim:

1. A record display medium comprising: a conductive substrate; and a liquid crystal/polymer composite film provided on the conductive substrate, the liquid crystal/polymer composite film comprising a smectic liquid crystal and a dichroic dye dispersed in a polymer matrix, the liquid crystal comprising a liquid crystal mixture having the following composition, the dichroic dye comprising a black dichroic dye comprised of a mixture of dichroic azo dyes:

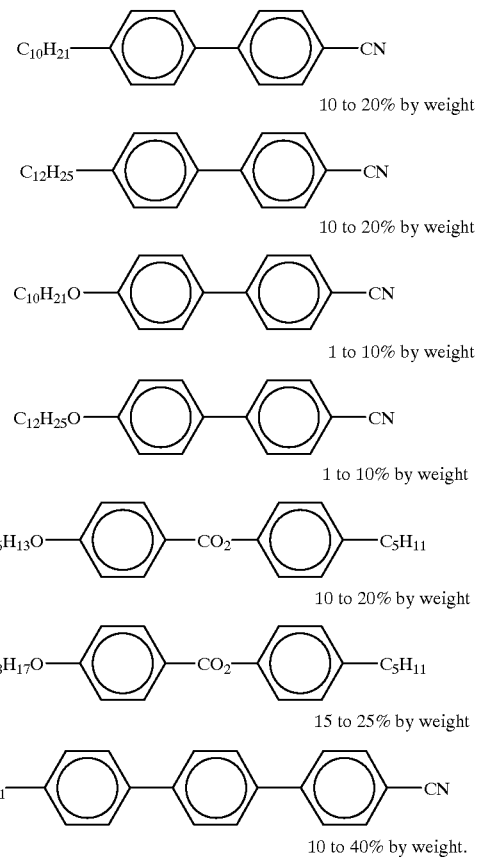

2. The record display medium according to claim 1, which has a difference in lightness between a written area and an erased area, |ΔL*|, in the range of from 5 to 25.

3. The record display medium according to claim 1, which has a difference in chroma between a written area and an erased area, |ΔC*|, in the range of from 0 to 10.

4. The record display medium according to claim 1, wherein particles of the liquid crystal composition are in the form of microcapsules.

5. The record display medium according to claim 1, wherein the liquid/polymer composite film has been formed by an emulsion method.

6. The record display medium according to claim 1, which further comprises a protective layer on the composite film.

7. The record display medium according to claim 1, wherein the dichroic dye comprises at least the following dyes (I) and/or (II):

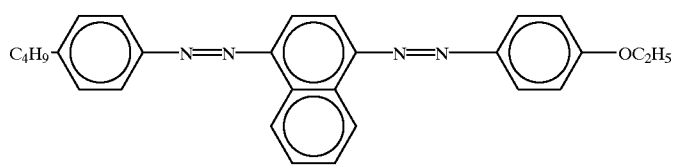

-continued

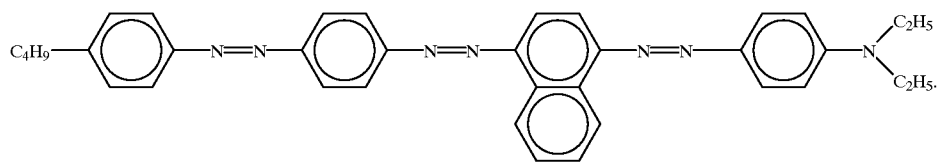
(II)

8. The record display medium according to claim 7, wherein the dichroic dye comprises a mixture comprising at least 20 to 40% by weight of the dye (I) and 20 to 40% by weight of the dye (II).

9. The record display medium according to claim 1, wherein the content of the dichroic dye is 1 to 10 parts by weight based on 100 parts by weight of the liquid crystal mixture.

10. A method for recording information comprising the steps of:
   providing a record display medium according to claim 1; and
   recording information on said record display medium by means of heat.

* * * * *